US012561411B2

(12) United States Patent
Wang et al.

(10) Patent No.: US 12,561,411 B2
(45) Date of Patent: Feb. 24, 2026

(54) METHOD, DEVICE, AND COMPUTER PROGRAM PRODUCT FOR EMBEDDING WATERMARK

(71) Applicant: Dell Products L.P., Round Rock, TX (US)

(72) Inventors: Zijia Wang, London (GB); Qiang Chen, Shanghai (CN); Sanping Li, Beijing (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 18/679,962

(22) Filed: May 31, 2024

(65) Prior Publication Data

US 2025/0335555 A1    Oct. 30, 2025

(30) Foreign Application Priority Data

Apr. 26, 2024    (CN) .......................... 202410516720.7

(51) Int. Cl.
G06F 21/16        (2013.01)
G06T 1/00        (2006.01)

(52) U.S. Cl.
CPC ............ *G06F 21/16* (2013.01); *G06T 1/0071* (2013.01); *G06T 1/0085* (2013.01)

(58) Field of Classification Search
CPC ...... G06F 21/16; G06T 1/0071; G06T 1/0085
See application file for complete search history.

(56) References Cited

U.S. PATENT DOCUMENTS

2002/0015508 A1*    2/2002    Hannigan ............ H04N 1/3216
                                                            382/199
2002/0122564 A1*    9/2002    Rhoads .................. G06F 16/29
                                                            382/100
2006/0133477 A1*    6/2006    Zhang ................ H04N 21/4405
                                                            375/240.18

(Continued)

OTHER PUBLICATIONS

I. J. Cox et al., "Digital Watermarking and Steganography," Morgan Kaufmann Publishers, Nov. 13, 2007, 587 pages.

(Continued)

*Primary Examiner* — Michael Won

(74) *Attorney, Agent, or Firm* — Ryan, Mason & Lewis, LLP

(57)                ABSTRACT
A method in an illustrative embodiment includes generating, by a content generation model, first content based on a user-inputted instruction. The method further includes generating a first watermark for determining a user source based on a user identifier. The method further includes generating a second watermark for determining a model source based on a model parameter of the content generation model. The method further includes embedding the first watermark and the second watermark into the first content to generate second content with dual watermarks. In this way, a content source can be traced without modifying or retraining the content generation model, thereby simplifying the watermark embedding process, and improving the watermark embedding efficiency. In addition, the watermark can be extracted without accessing the content generation model, so that the watermark extraction process is more convenient and efficient.

20 Claims, 7 Drawing Sheets

100

(56)                    References Cited

U.S. PATENT DOCUMENTS

| | | | | |
|---|---|---|---|---|
| 2015/0071485 | A1* | 3/2015 | Rhoads | H04N 23/56 |
| | | | | 382/100 |
| 2021/0067842 | A1* | 3/2021 | Revital | G06F 21/1063 |
| 2021/0390447 | A1* | 12/2021 | Cheruvu | G06N 20/00 |
| 2025/0103743 | A1* | 3/2025 | Passoja | G06F 21/64 |

OTHER PUBLICATIONS

L. K. Saini et al., "A Survey of Digital Watermarking Techniques and Its Applications," International Journal of Computer Science Trends and Technology, vol. 2, No. 3, May-Jun. 2014, pp. 70-73.

J. Zhang et al., "Protecting Intellectual Property of Deep Neural Networks with Watermarking," Proceedings of the 2018 on Asia Conference on Computer and Communications Security, Jun. 2018, pp. 159-171.

H. Wu et al., "Watermarking Neural Networks with Watermarked Images," IEEE Transactions on Circuits and Systems for Video Technology, vol. 31, No. 7, Jul. 2021, pp. 2591-2601.

H. K. Singh et al., "GAN-based Watermarking for Encrypted Images in Healthcare Scenarios," Neurocomputing, vol. 560, Dec. 1, 2023, 9 pages.

J. Huang et al., "ARWGAN: Attention-Guided Robust Image Watermarking Model Based on GAN," IEEE Transactions on Instrumentation and Measurement, vol. 72, Jun. 19, 2023, 17 pages.

P. Fernandez et al., "Functional Invariants to Watermark Large Transformers," arXiv:2310.11446v2, Jan. 18, 2024, 5 pages.

F. B. Baldassini et al., "Cross-Attention Watermarking of Large Language Models," arXiv:2401.06829v1, Jan. 12, 2024, 5 pages.

P. Indyk et al., "Approximate Nearest Neighbors: Towards Removing the Curse of Dimensionality," Proceedings of the Thirtieth Annual ACM Symposium on Theory of Computing, Dec. 30, 1999, 20 pages.

* cited by examiner

600

METHOD, DEVICE, AND COMPUTER PROGRAM PRODUCT FOR EMBEDDING WATERMARK

RELATED APPLICATION

The present application claims priority to Chinese Patent Application No. 202410516720.7, filed Apr. 26, 2024, and entitled "Method, Device, and Computer Program Product for Embedding Watermark," which is incorporated by reference herein in its entirety.

FIELD

Embodiments of the present disclosure relate to the field of information security, and more specifically relate to a method, device, and computer program product for embedding a watermark.

BACKGROUND

Watermarking technology typically involves embedding hidden information into digital content (such as image, text, audio, and video) with the purpose of validating authenticity and integrity of the content and tracing a source and distribution of the content. With the rapid development of machine learning, increasingly more content is generated by content generation models. In these and other situations, watermarking technology can protect content creators and validate the source and authenticity of the content.

Watermark embedding is generally designed based on consideration of multiple factors, including watermark robustness, embedding capacity, security, and computational efficiency. The robustness refers to an ability for a watermark to be reliably extracted after undergoing various image processing operations (such as compression, clipping, and filtering). The embedding capacity refers to the magnitude of information of an embeddable watermark. The security involves ensuring that the watermark is not easily detected and removed by an unauthorized third party. The computational efficiency involves the computational costs of watermark embedding and extraction.

SUMMARY

Embodiments of the present disclosure provide a method, device, and computer program product for embedding a watermark.

In a first aspect of embodiments of the present disclosure, a method is provided. The method includes generating, by a content generation model, first content based on a user-inputted instruction. The method further includes generating a first watermark for determining a user source based on a user identifier. The method further includes generating a second watermark for determining a model source based on a model parameter of the content generation model. The method further includes embedding the first watermark and the second watermark into the first content to generate second content with dual watermarks.

In a second aspect of embodiments of the present disclosure, an electronic device is provided. The electronic device includes at least one processor, and a memory coupled to the at one processor and having instructions stored therein. The instructions, when executed by the at least one processor, cause the electronic device to perform actions comprising: generating, by a content generation model, first content based on a user-inputted instruction; generating a first watermark for determining a user source based on a user identifier; generating a second watermark for determining a model source based on a model parameter of the content generation model; and embedding the first watermark and the second watermark into the first content to generate second content with dual watermarks.

In a third aspect of embodiments of the present disclosure, a computer program product is provided. The computer program product is tangibly stored on a non-transitory computer-readable medium and comprises machine-executable instructions. The machine-executable instructions, when executed by a machine, cause the machine to perform actions comprising: generating, by a content generation model, first content based on a user-inputted instruction; generating a first watermark for determining a user source based on a user identifier; generating a second watermark for determining a model source based on a model parameter of the content generation model; and embedding the first watermark and the second watermark into the first content to generate second content with dual watermarks.

It should be understood that the content described in this Summary is neither intended to identify key or important features of embodiments of the present disclosure, nor intended to limit the scope of the present disclosure. Other features of the present disclosure will become readily understood with reference to the additional description provided herein.

BRIEF DESCRIPTION OF THE DRAWINGS

In conjunction with the drawings and with reference to the Detailed Description below, the above and other features, advantages, and aspects of embodiments of the present disclosure will become more apparent. Identical or similar reference numerals in the drawings represent identical or similar elements, in which.

Identical or similar reference numerals in all the drawings represent identical or similar elements.

DETAILED DESCRIPTION

Figure 1:
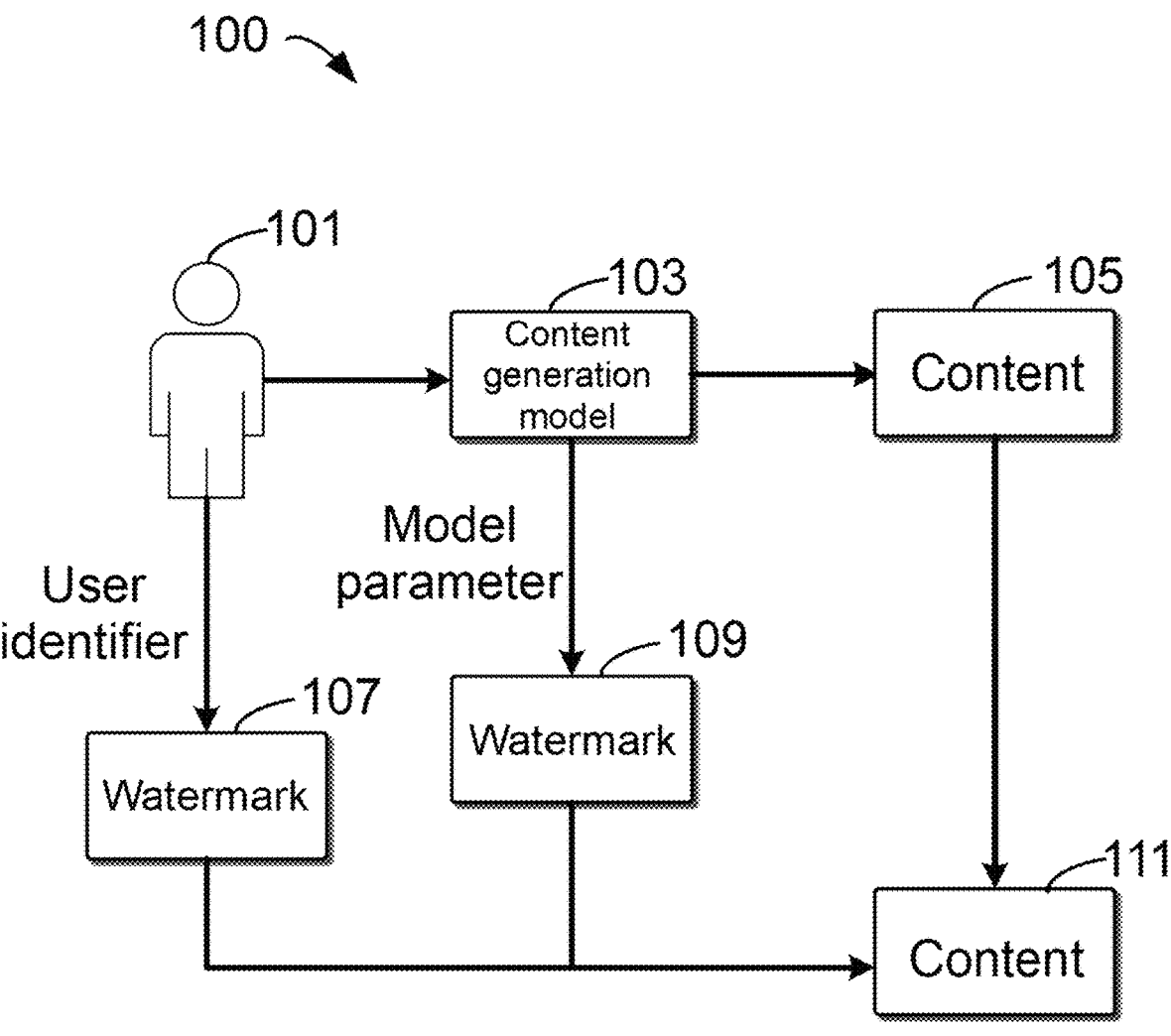
FIG. 1 is a schematic diagram of an example environment in which multiple embodiments of the present disclosure may be implemented.

Embodiments of the present disclosure will be described in more detail below with reference to the drawings. While some embodiments of the present disclosure are shown in the drawings, it should be understood that the present disclosure may be implemented in various forms and should not be construed as being limited to the embodiments set forth herein. On the contrary, these embodiments are provided to more thoroughly and completely understand the present disclosure. It should be understood that the drawings and embodiments of the present disclosure are only used as examples and are not intended to limit the scope of protection of the present disclosure.

In the description of embodiments of the present disclosure, the term "including" and similar wordings thereof should be construed as open-ended inclusions, i.e., "including, but not limited to." The term "based on" should be construed as "at least partially based on." The term "an embodiment" or "the embodiment" should be construed as "at least one embodiment." The terms "first," "second," and the like may refer to different or identical objects, unless expressly stated otherwise. Other explicit and implicit definitions may be further included below.

With the rapid advancement of machine learning technology, a content generation model has become an important force in the field of content creation. However, this has also brought new challenges, namely, how to ensure that rights and benefits of model owners and content creators are not infringed. As an effective means for digital information protection, watermarking technology plays an important role in the field of protection of generated content.

At present, most solutions for embedding a watermark in generated content have some limitations. For example, some solutions embed watermark information directly into an internal structure and a parameter of a model. The watermark implementation of these solutions may involve adjusting the model architecture or adding a particular watermark embedding mechanism in a training process of the model, which may increase the computational costs and increase the overfitting risks. Some other watermarking solutions need to access a generation model when extracting a watermark. The watermarking solutions that extract a watermark relying on a generation model have disadvantages such as poor flexibility, complex operations, and high risks.

To address these and other problems, an embodiment of the present disclosure provides a solution for embedding a watermark. In this solution, after a content generation model generates content, a first watermark for determining a user source is generated based on a user identifier, a second watermark for determining a model source is generated based on a model parameter, and the two watermarks are embedded into the content generated by the content generation model, to obtain content with dual watermarks, namely, the first and second watermarks. In this way, a content source can be traced without modifying or retraining the content generation model, thereby simplifying the watermark embedding process, reducing the difficulty, improving the watermark embedding efficiency, and avoiding the risks of performance reduction or quality loss that may be caused by modifying the model. In addition, the watermark can be extracted without accessing the content generation model, so that the watermark extraction process is more convenient and efficient, thereby reducing the risks of watermark extraction failure due to model changes or inaccessibility.

FIG. 1 is a schematic diagram of an example environment 100 in which multiple embodiments of the present disclosure may be implemented. As shown in FIG. 1, the example environment 100 may include a user 101 and a content generation model 103. The content generation model 103 may generate, based on an instruction transmitted by the user 101, content 105 corresponding to the instruction. The content generation model 103 may be a model trained using machine learning technology and may generate content of a particular type based on an instruction or condition inputted by the user 101. The content generation model 103 can support instruction inputs of a plurality of types. The user 101 may transmit the instruction in various forms, such as text, voice, or picture, to describe the type, style, or particular requirements of content to be generated. In terms of content generation, the content generation model 103 can support output content of a plurality of types, that is, content 105 may be in various forms, such as image, text, audio, and video.

With continued reference to FIG. 1, a user identifier generally will be assigned to the user 101. The user identifier is configured to identify and manage activities and interactions of the user in the system. The user identifier may be a username, an email address, a digital ID, or a unique identifier in other form. The user identifier ensures the identity uniqueness and traceability of each user in a network environment. In embodiments of the present disclosure, a watermark 107 can be generated based on the user identifier, and the watermark 107 can be used to determine a user source, that is, user ownership of the content.

In some embodiments, the content generation model 103 may include a model parameter, which may be a parameter that defines the characteristics, capability, and behavior of the model. The model parameter may include a model name, an architecture, an internal parameter, and the like. Based on the model parameter, another watermark 109 is generated, and the watermark 109 is used to determine a model source, that is, which model generates the content.

In some embodiments, the watermark 107 and the watermark 109 can be embedded into content 105 generated by the content generation model 103, to obtain content 111 with the dual watermarks. When the watermark-embedded content 111 is distributed or propagated, by extracting and analyzing the watermark 107, an original creator or publisher of the content can be determined, thereby effectively protecting the rights and interests of the user. Additionally, by extracting and analyzing the watermark 109, a generation source, that is, the model source, of the content can be traced.

As can be seen from the above description, in this solution, after the content generation model generates the content, the watermark for determining the user source is generated based on the user identifier, the watermark for determining the model source is generated based on the model parameter, and the two watermarks are embedded into the content generated by the content generation model, to obtain the content with the dual watermarks. In this way, a content source can be traced without modifying or retraining the content generation model, thereby simplifying the watermark embedding process. In addition, in this way, the watermark can be extracted without accessing the content generation model, so that the watermark extraction process is more convenient and efficient. Accordingly, this solution not only effectively traces the content source, but also improves the application effects and user experience of watermarking technology by, for example, simplifying the embedding process, reducing the operational difficulty, and convenient extraction.

It should be understood that the architecture and function in the example environment 100 are described merely for example purposes, and do not imply any limitation to the scope of the present disclosure. Embodiments of the present disclosure may also be applied to other environments with different structures and/or functions.

Example processes in embodiments of the present disclosure will be described in detail below with reference to FIGS. 2 to 6. For ease of understanding, all specific data mentioned in the following description is illustrative and is not used for limiting the scope of protection of the present disclosure. It is to be understood that embodiments described below may further include additional actions that are not shown and/or may omit actions that are shown, and the scope of the present disclosure is not limited in this respect.

Figure 2:
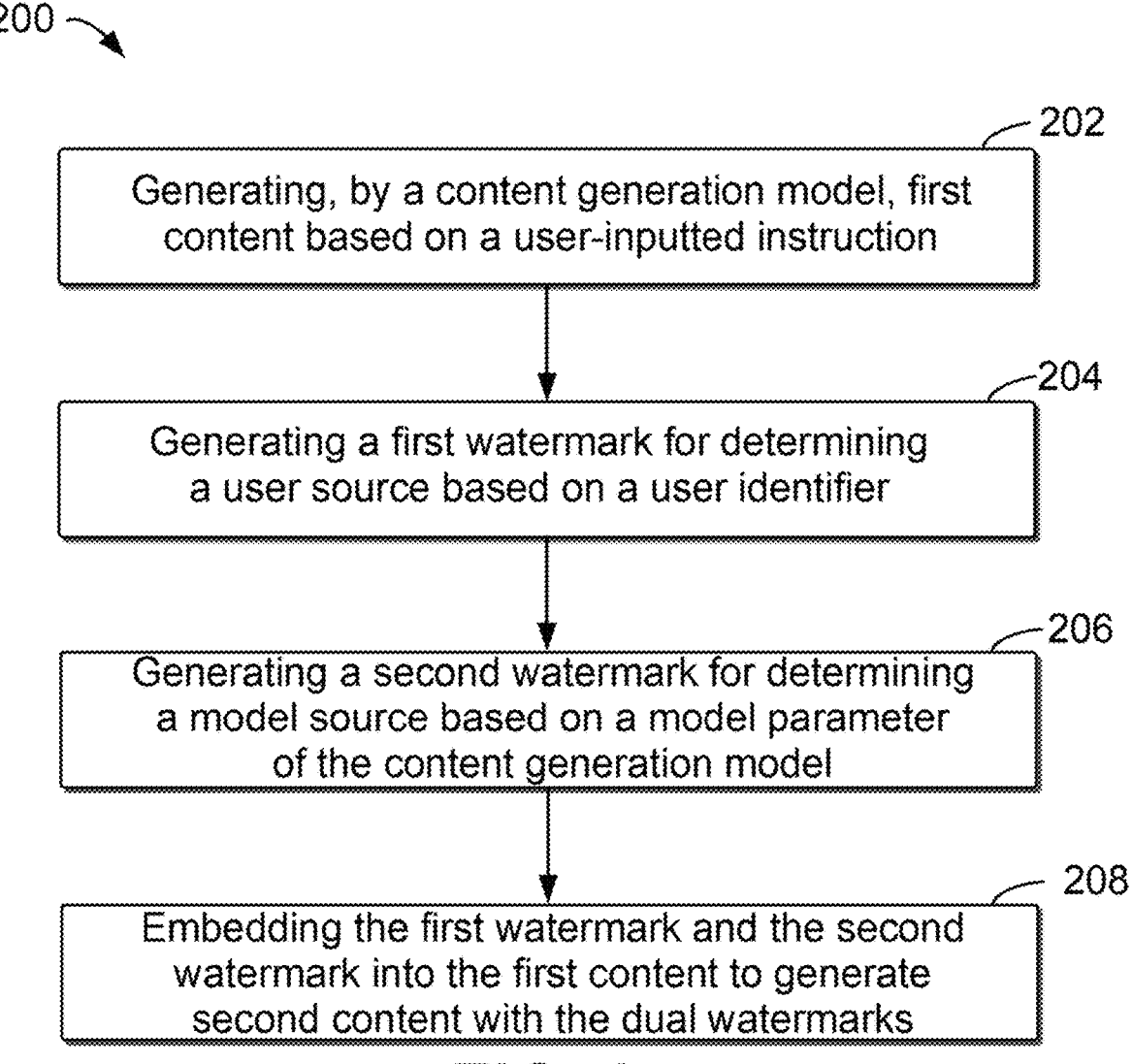
FIG. 2 is a flow chart of a method for embedding a watermark according to some embodiments of the present disclosure.

FIG. 2 is a flow chart of a method 200 for embedding a watermark according to some embodiments of the present disclosure. At block 202, a content generation model generates first content based on a user-inputted instruction. For example, as shown in FIG. 1, the first content may be content 105. The content generation model 103 may be trained by machine learning technology and can generate corresponding content 105 based on an instruction transmitted by the user 101. The instruction transmitted by the user 101 may be derived from text, voice, or picture, and can cover the content type, style, and particular requirements. The content generation model 103 can generate content 105 in various forms, such as image, text, audio, and video, to satisfy diversified requirements of the user 101.

At block 204, a first watermark for determining a user source is generated based on a user identifier. For example, as shown in FIG. 1, the first watermark may be the watermark 107. The user identifier may be a username, an email address, a digital ID, or a unique identifier in other form. The user identifier ensures the identity uniqueness and traceability of each user in a network environment. The watermark 107 may be generated based on the user identifier using a common watermark generation method, such as a hash function, a combination of encoding and encryption, and/or a digital signature, which may specifically be selected based on actual requirements. The generation method of the watermark 107 is not limited in the present disclosure, specifically, as long as the method can achieve the purpose of generating a watermark that can determine the user source.

At block 206, a second watermark for determining a model source is generated based on a model parameter of the content generation model. For example, as shown in FIG. 1, the second watermark may be the watermark 109. The content generation model 103 may include a model parameter, which may be a parameter that defines the characteristics, capability, and behavior of the model. The model parameter may include a model name, an architecture, an internal parameter, and the like. The watermark 109 may be generated based on the user identifier using a common watermark generation method, such as a hash function, a combination of encoding and encryption, and/or a digital signature, which may specifically be selected based on actual requirements. The generation method of the watermark 109 is not limited in the present disclosure, specifically, as long as the method can achieve the purpose of generating a watermark that can determine the model source.

At block 208, the first watermark and the second watermark are embedded into the first content to generate second content with the dual watermarks. For example, as shown in FIG. 1, the watermark 107 and the watermark 109 can be embedded into the content 105 to form the content 111 with the dual watermarks. After the content 111 is distributed or propagated, the watermark 107 is extracted and analyzed by dedicated technical means, which can effectively trace an original creator or publisher of the content, thereby effectively protecting the rights and interests of the user. Further, by extracting and analyzing the watermark 109, a generation model of the content 111, that is, the model source, can be accurately traced.

In this way, a content source can be traced without modifying or retraining the content generation model, thereby simplifying the watermark embedding process, reducing the difficulty, improving the watermark embedding efficiency, and avoiding the risks of performance reduction or quality loss that may be caused by modifying the model. In addition, in this way, the watermark can be extracted without accessing the content generation model, so that the watermark extraction process is more convenient and efficient, thereby reducing the risks of watermark extraction failure due to model changes or inaccessibility.

A process of embedding a watermark will be described in detail below with reference to FIGS. 3 to 6. In embodiments of the present disclosure, explanations are given in sequence of generating a local watermark, generating content with dual watermarks, adjusting a watermark pixel or coefficient, and determining a content source. All specific data mentioned in the following description is illustrative and is not used for limiting the scope of protection of the present disclosure. It is to be understood that embodiments described below may further include additional actions that are not shown and/or may omit actions that are shown, and the scope of the present disclosure is not limited in this respect.

Figure 3:
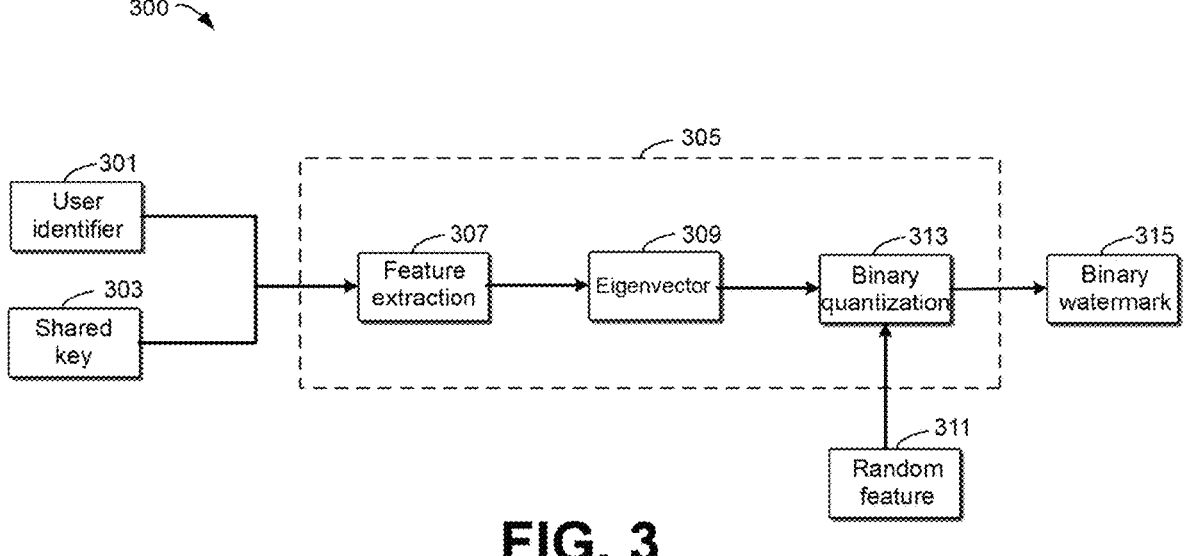
FIG. 3 is a schematic diagram of a process of generating a local watermark according to some embodiments of the present disclosure.

FIG. 3 is a schematic diagram of a process 300 of generating a local watermark according to some embodiments of the present disclosure. As shown in FIG. 3, a local watermark can be generated using a watermark generator 305 based on a user identifier 301 and a shared key 303. The watermark generator 305 may be a tool or software for generating a watermark. The watermark generator 305 can generate a watermark with attributes such as a particular style, position, and size based on particular information or a parameter provided by the user. The shared key 303 may be a key for encrypting and decrypting data and is generally held jointly by the user and at least one authorizing party. When the shared key 303 is used for generating a local watermark, it can be used for validating legality of a user source during extraction of the local watermark. The local watermark is a watermark that is embedded into a partial region of the content, rather than covering a whole content block. The local watermark generally has a small size and a particular position, to avoid interfering with or blocking the original content.

In some embodiments, generating a local watermark may include two steps: feature extraction and binary quantization. At block 307, a feature is extracted based on the user identifier and the shared key. The extracted feature can be expressed as concatenation of the user identifier 301 and the shared key 303:

$$f = [u, k] \in \mathbb{R}^d \tag{1}$$

wherein f represents a local feature, u represents the user identifier, k represents the shared key, and d represents a feature dimension. After the local feature f is extracted, illustratively in the form of at least one eigenvector 309, binary quantization of the local feature f is performed at block 313 using a random feature 311. The random feature 311 can be generated from a Gaussian distribution, and the random feature 311 can be expressed as:

$$r_i \sim N(0, I_d), i = 1, 2, \ldots n \tag{2}$$

wherein $r_i$ represents an i-th random feature, $1_d$ represents a d-dimensional unit matrix, and n represents a binary code length. Before binary quantization of the local feature f, the local feature f can be first normalized:

$$\|f\|_2 = 1 \qquad (3)$$

Binary quantization of the normalized local feature f is illustratively performed as follows:

$$bi = \text{sign}(f \cdot r_i), \quad i = 1, 2, \dots, n \qquad (4)$$

wherein $b_i$ represents an i-th bit of binary code. Then, a binary watermark 315 can be expressed as:

$$b = [b_1, b_2, \dots, b_n] \in \{-1, 1\}^n \qquad (5)$$

In embodiments of the present disclosure, a watermark in the form of binary code is used as the local watermark, which has various beneficial effects. First, binary watermark 315 is generated based on the shared key 303 unique to the user and the authorizing party and has security attributes. Without the shared key 303, it is very difficult to reverse or restore an original input from the binary watermark 315. In addition, the binary watermark 315 is generated based on the local feature f normalized to a unit length. As long as an input is close to the original input in a feature space, it is not sensitive to a small change or noise in the input and has very strong stability. Finally, the binary watermark 315 is represented by fixed and short-length binary code and can be easily generated and stored through simple operations, such as splicing, normalization, and a sign function.

In some embodiments, redundancy via an error correcting code can be added into the binary watermark 315 to improve the robustness and reliability of the watermark. The error correcting code is added to increase the redundancy of watermark information, so that even when the watermark is damaged or interfered with by noise to a certain extent, the integrity and detectability of the watermark can still be maintained. The error correcting code is used to detect and correct errors in the watermark information. When the watermark is affected by noise, compression, or distortion in other forms, the error correcting code can detect and correct these errors to ensure the accuracy of the extracted watermark information. The local watermark into which the error correcting code is added can be expressed as:

$$l = [l_1, l_2, \dots, l_p] \in \{-1, 1\}^p \qquad (6)$$

wherein $l_i$ represents an i-th bit of the local watermark, and p represents a length of the local watermark.

Figure 4:
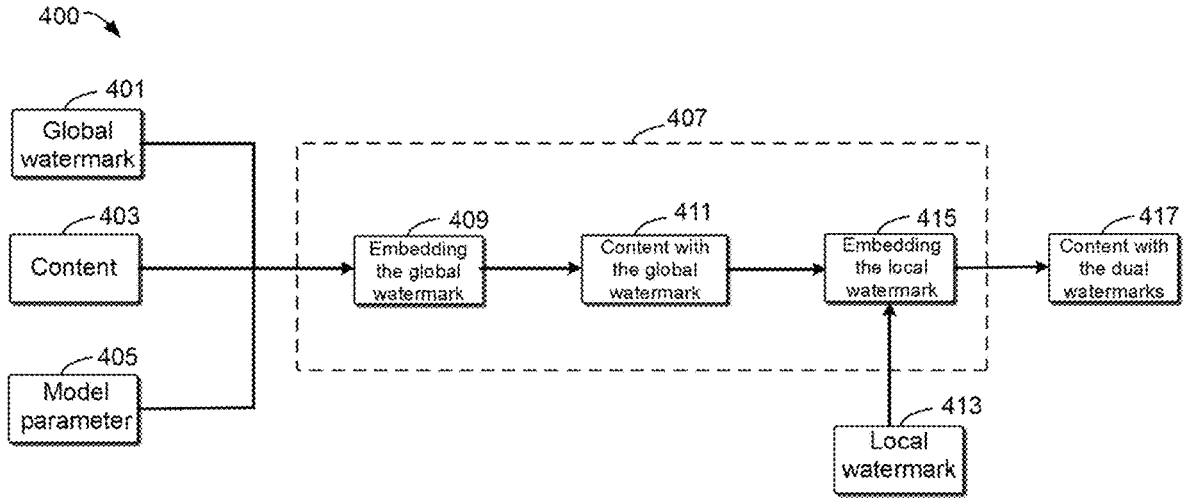
FIG. 4 is a schematic diagram of a process of generating content with dual watermarks according to some embodiments of the present disclosure.

FIG. 4 is a schematic diagram of a process 400 of generating content with dual watermarks according to some embodiments of the present disclosure. As shown in FIG. 4, a global watermark 401 (e.g., a global watermark g) and a local watermark 413 (e.g., a local watermark l) can be embedded into content 403 using a watermark embedder 407, to generate content 417 with the dual watermarks. The watermark embedder 407 may be a specialized tool or software component, and mainly functions to embed watermark information into the content 403 generated by a content generation model. The content 403 may be in the form of, for example, picture, video, audio, or text. The global watermark 401 is used for determining a model source, that is, indicating which content generation model generates the particular content 403. The global watermark 401 is designed to cover the whole content, thereby ensuring that the presence of the watermark can be detected no matter which part of the content the watermark is in. In some embodiments, a global feature can be extracted based on a model parameter 405 of the content generation model, and then binary quantization of the global feature is performed using a random feature to generate the global watermark 401 in the form of binary code. The global watermark 401 can be expressed as:

$$g = [g_1, g_2, \dots, g_m] \in \{-1, 1\}^m \qquad (7)$$

wherein $g_i$ represents an i-th bit of the global watermark, and m represents a length of the global watermark.

At block 409, a global watermark 401 can be first embedded into different domains of the content 403 using a spread spectrum strategy, to generate content 411 with the global watermark 401:

$$C' = C + \alpha g \qquad (8)$$

wherein C represents the content, C' represents the content with the global watermark, and $\alpha$ represents a scaling factor that controls the watermark strength.

At block 415, the local watermark 413 can then be embedded into different domains of the content 411 with the global watermark 401 using the spread spectrum strategy to generate the content 417 with the dual watermarks:

$$C'' = C' + \beta l \qquad (9)$$

wherein C'' represents the content with the dual watermarks, and $\beta$ represents a scaling factor that controls the watermark strength. Of course, the local watermark 413 may be first embedded, and then the global watermark 401 is embedded, or the watermarks can be embedded at the same time. The specific embedding process may be selected based on actual requirements. In embodiments of the present disclosure, the dual watermarks are embedded into different domains of the content 403 using the spread spectrum strategy. Different domains may include the time domain or spatial domain, and embedding the dual watermarks into different domains of the content using the spread spectrum strategy can significantly improve the robustness, security, capacity, and flexibility of the watermarks.

In this way, embedding the global watermark 401 and the local watermark 413 into the content 403 at the same time can improve the security and robustness of the watermarks, and implement model ownership and content identification functions in the same framework. In addition, this method can further effectively resist various attacks that may destroy or remove the watermark information.

Figure 5:
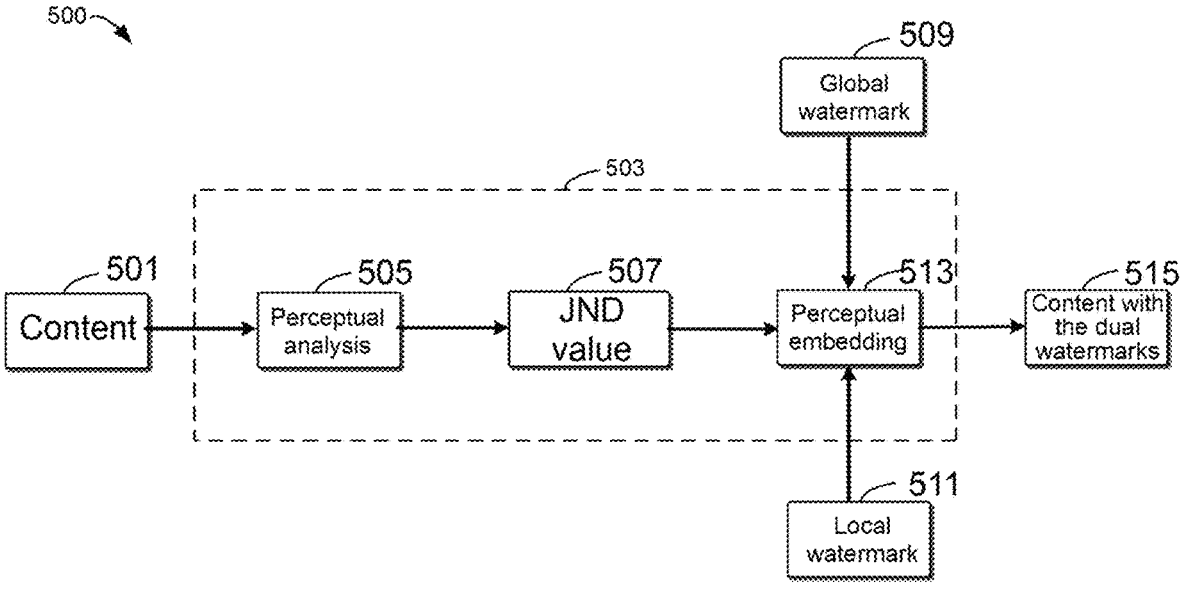
FIG. 5 is a schematic diagram of a process of adjusting pixel values or coefficient values with dual watermarks according to some embodiments of the present disclosure.

FIG. 5 is a schematic diagram of a process 500 of adjusting pixel values or coefficient values with dual watermarks according to some embodiments of the present disclosure. As shown in FIG. 5, a global watermark 509 (e.g., a global watermark g) and a local watermark 511 (e.g., a local watermark l) can be embedded into content 501 using a watermark embedder 503, to generate content 515 with the dual watermarks. The watermark embedder 503 may be a specialized tool or software component, and mainly functions to embed watermark information into the content 501 generated by a content generation model. The content 501 may be in the form of, for example, picture, video, audio, or text.

In some embodiments, the global watermark 509 and the local watermark 511 may be embedded into different channels or domains of the content 501 using a human visual system (HVS) strategy, such that the watermarks are invisible to human eyes without reducing the quality of the content 501. A process of embedding a watermark based on the HVS strategy may include two steps. At block 505, perceptual analysis is performed on each pixel or coefficient of the content. In the perceptual analysis process, the content 501 generated by the content generation model is analyzed based on the HVS strategy, and a just noticeable difference (JND) value of each pixel or coefficient of the content 501 is computed. A JND value 507 may be expressed by the following Equation (10):

$$J = [J_1, J_2, \ldots J_q] \in \mathbb{R}^q \qquad (10)$$

wherein $J_i$ represents a JND value of an i-th pixel or coefficient of the content, q represents the number of pixels or coefficients in the content, and the JND value 507 measures the smallest change amount of a stimulus that can be detected by the human eyes based on consideration of many factors such as brightness, contrast ratio, texture, frequency, or content masking effects. The JND value 507 can be used to determine the maximum strength of the watermark that can be embedded into the content, to ensure that the watermark is undetectable and will not cause any noticeable distortion. Before the watermark is embedded, the JND value 507 can be normalized:

$$0 \le J_i \le 1, \quad i = 1, 2, \ldots, q \qquad (11)$$

At block 513, the watermark is embedded into different domains of the content based on the JND value generated after the perceptual analysis. In the perception embedding step, the JND value can be used based on the HVS strategy, to embed the global watermark 509 and the local watermark 511 into different channels or domains of the content 501, such as RGB channel, YCbCr channel, HSV channel, DCT domain, DWT domain, or DFT domain. The channels or domains to which the watermark is embedded depend on the type and format of the content 501, which may specifically be selected based on actual requirements. Watermark embedding can be achieved by adjusting a pixel or coefficient value of the content 501, which can be achieved using the following Equation (12):

$$C_i'' = C_i + \gamma J_i W_i, \quad i = 1, 2, \ldots, q \qquad (12)$$

wherein $C_i$ represents an i-th pixel value or coefficient value of the content, $C_i''$ represents an i-th pixel value or coefficient value of the watermark, $W_i$ represents the watermark information of the i-th pixel or coefficient of the content, and $\gamma$ represents a scaling factor that controls the watermark strength. The watermark in Equation (12) may be the global watermark 509, or may be the local watermark 511.

In this way, the watermark information can be embedded into an optimal position of the content. The strength and position of the watermark can be accurately controlled, to ensure that the watermark has the least impact on visual perception of the content and to realize imperceptible embedding of the watermark information. Further, since the watermark information is embedded based on visual characteristics of the content, the robustness and effectiveness of the watermark can be maintained even if the content is subject to distortion or attack to a certain extent.

Figure 6:
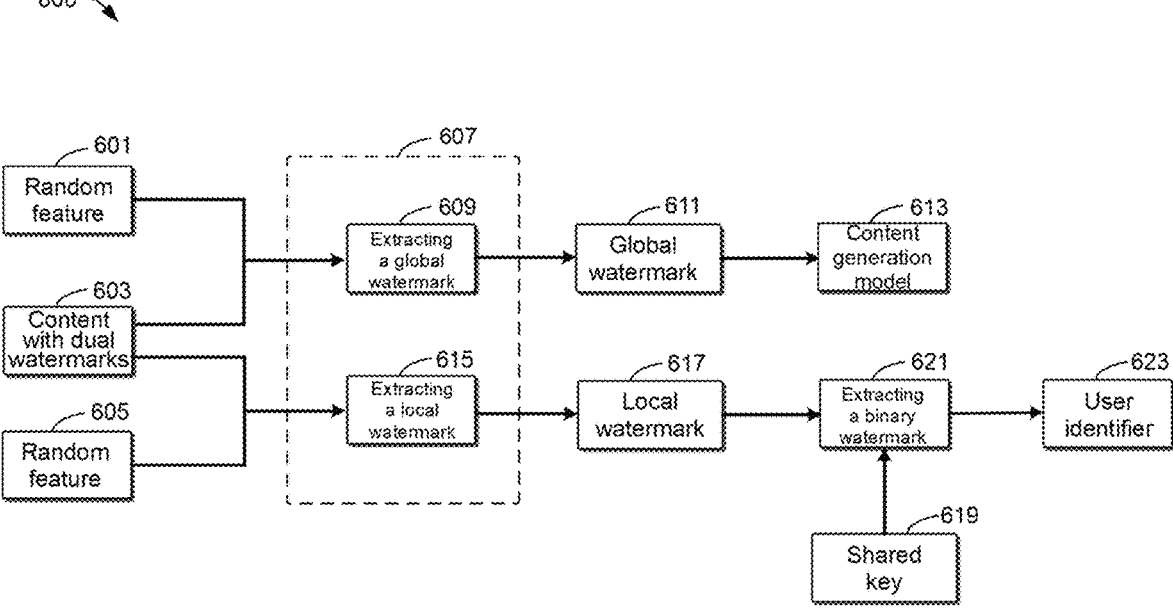
FIG. 6 is a schematic diagram of a process of determining a user source and a model source according to some embodiments of the present disclosure.

FIG. 6 is a schematic diagram of a process 600 of determining a user source and a model source according to some embodiments of the present disclosure. As shown in FIG. 6, when a model source of content 603 with dual watermarks is determined, a global watermark 611 (e.g., a global watermark g) in the content 603 with the dual watermarks can be extracted using a watermark extractor 607. The watermark extractor 607 may be any tool with a watermark extraction function, which may specifically be selected based on actual requirements. At block 609, the global watermark 611 is extracted. The global watermark 611 can be extracted from different domains of the content based on the type and format of the content. When the global watermark 611 is generated based on a spread spectrum strategy, the global watermark 611 can be extracted based on the spread spectrum strategy:

$$g_i = \text{sign}(C'' \cdot s_i), i = 1, 2, \ldots, m \qquad (13)$$

wherein $g_i$ represents an i-th bit of the global watermark, $C''$ represents the content with the dual watermarks, and $s_i$ represents a random feature. After the global watermark 611 is extracted, the model source of the content can be determined, that is, a content generation model 613.

At block 615, a local watermark 617 (e.g., a local watermark l) is extracted. The local watermark 617 can be extracted from different domains of the content based on the type and format of the content. When the local watermark 617 is generated based on the spread spectrum strategy, the local watermark 617 can be extracted based on the spread spectrum strategy:

$$l_i = \text{sign}(C'' \cdot r_i), i = 1, 2, \ldots, p \qquad (14)$$

wherein $l_i$ represents an i-th bit of the local watermark, $C''$ represents the content with the dual watermarks, and $r_i$ represents a random feature. After the local watermark 617 is extracted, a binary watermark in the local watermark 617 can be extracted 621 based on a shared key 619 owned by an authorizing party. The user source, that is, a user identifier 623, can be determined based on the binary watermark.

In this way, the watermark can be extracted simply and efficiently and without accessing the content generation model, so that the watermark extraction process is more convenient and efficient, thereby reducing the risks of watermark extraction failure due to model changes or inaccessibility.

Figure 7:
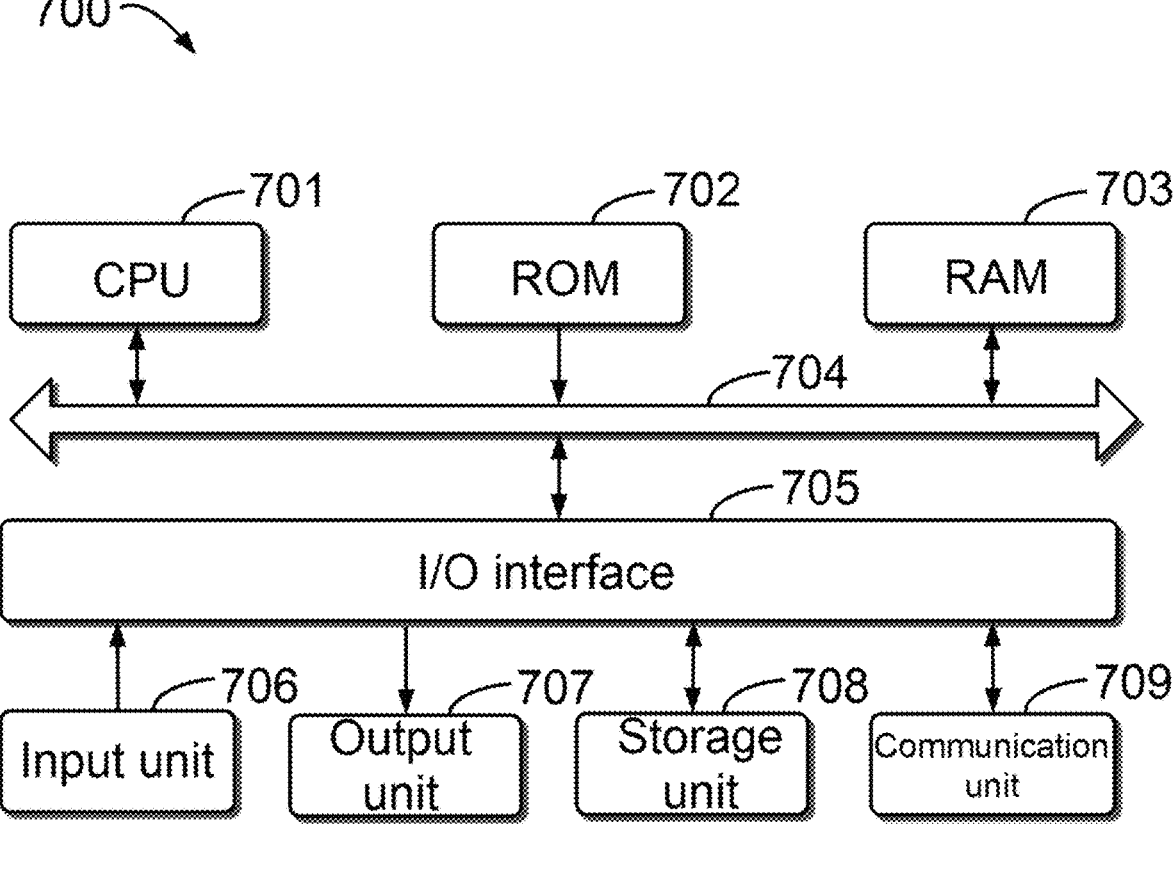
FIG. 7 is a block diagram of a device that can implement multiple embodiments of the present disclosure.

FIG. 7 is a block diagram of an example device 700 that may be configured to implement embodiments of the present disclosure. As shown in the figure, the device 700 includes a computing unit 701, illustratively implemented as at least one central processing unit (CPU), which may execute various appropriate actions and processes in accordance with computer program instructions stored in a read-only memory (ROM) 702 or computer program instructions loaded into a random-access memory (RAM) 703 from a storage unit 708. The RAM 703 may further store various programs and data required by operations of the device 700. The computing unit 701, the ROM 702, and the RAM 703 are connected to each other through a bus 704. An input/output (I/O) interface 705 is also connected to the bus 704.

A number of components in the device 700 are connected to the I/O interface 705, including: an input unit 706, such as a keyboard or a mouse; an output unit 707, such as various types of displays or speakers; the storage unit 708, such as a magnetic disk or an optical disk; and a communication unit 709, such as a network card, a modem, or a wireless communication transceiver. The communication unit 709 allows the device 700 to exchange information/data with other devices via a computer network such as the Internet and/or various telecommunication networks.

The computing unit 701 may comprise various general-purpose and/or special-purpose processing components having a processing power and a computing power. Some examples of the computing unit 701 include, but are not limited to, the above-noted one or more CPUs, a graphics processing unit (GPU), various special-purpose artificial intelligence (AI) computing chips, various computing units running a machine learning model algorithm, a digital signal processor (DSP), and any appropriate processor, controller, micro-controller, and the like. The computing unit 701 executes various methods and processes described above, such as the method 200. For example, in some embodiments, the method 200 may be implemented as a computer software program that is tangibly included in a machine-readable medium such as the storage unit 708. In some embodiments, part or all of the computer programs may be loaded and/or installed onto the device 700 via the ROM 702 and/or the communication unit 709. When the computer program is loaded into the RAM 703 and executed by the computing unit 701, one or more steps of the method 200 described above may be executed. Alternatively, in other embodiments, the computing unit 701 may be configured to execute the method 200 by any other appropriate approach (e.g., by means of firmware).

The functions described above herein may at least partially be executed by one or more hardware logic components. For example, non-restrictively, example types of usable hardware logic components include: a field programmable gate array (FPGA), an application specific integrated circuit (ASIC), an application specific standard product (ASSP), a system-on-chip system (SOC), a complex programmable logic device (CPLD), and so on.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or use in combination with, an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any appropriate combination of the above. Further, while the operations are depicted in a particular order, this should not be construed as an indication that the operations are requested to be executed in the particular order shown or in a sequential order, or that all illustrated operations are requested to be executed to achieve desired results. In certain environments, multitasking and parallel processing may be advantageous. Similarly, while a number of specific implementation details are included in the above description, these implementation details should not be construed as limiting the scope of the present disclosure. Some features described in the context of separate embodiments may also be implemented in combination in a single implementation. On the contrary, various features described in the context of a single implementation may also be implemented in a plurality of implementations separately or in any appropriate sub-combination.

While the present subject matter has been described in a language specific to structural features and/or logical actions of the method, it should be understood that the subject matter defined in the appended claims is not necessarily limited to the particular features or actions described above. On the contrary, the particular features and actions described above are merely example forms of implementing the claims.

What is claimed is:

1. A method, comprising:
   generating, by a content generation model, first content based on a user-inputted instruction;
   generating a first watermark for determining a user source based on a user identifier;
   generating a second watermark for determining a model source based on a model parameter of the content generation model; and
   embedding the first watermark and the second watermark into the first content to generate second content with dual watermarks;
   wherein the first watermark is generated at least in part as a function of (i) a local feature, the local feature being determined based on the user identifier and at least one key associated with the user identifier, and (ii) at least one random feature.

2. The method according to claim 1, wherein the generating a first watermark for determining a user source comprises:

generating the local feature based on the user identifier and a shared key corresponding to the user identifier; and generating a local watermark for determining the user source based on a product of the local feature and a preset first random feature.

3. The method according to claim 2, wherein the generating a second watermark for determining a model source comprises:

generating a global watermark for determining the model source based on the model parameter and a preset second random feature.

4. The method according to claim 3, wherein the generating second content with the dual watermarks comprises:

embedding the local watermark and the global watermark into a frequency domain or a spatial domain of the first content based on a spread spectrum strategy, to generate the second content with the dual watermarks.

5. The method according to claim 4, wherein the method further comprises:

extracting a local watermark in the second content after the watermarks are embedded based on the spread spectrum strategy and the first random feature; and determining the user identifier based on the extracted local watermark and the shared key.

6. The method according to claim 5, wherein the method further comprises:

extracting a global watermark in the second content after the watermarks are embedded based on the spread spectrum strategy and the second random feature; and determining the content generation model based on the extracted global watermark.

7. The method according to claim 1, wherein the generating second content with the dual watermarks comprises:

determining a just noticeable difference (JND) value for each pixel or coefficient in the first content;

adjusting each pixel value or coefficient value of the first watermark and the second watermark based on the JND value and each pixel value or coefficient value in the first content; and embedding the adjusted first watermark and the adjusted second watermark into the first content to generate the second content with the dual watermarks.

8. The method according to claim 1, wherein the generating second content with the dual watermarks comprises:

embedding the first watermark into a local vector of the first content based on a spread spectrum strategy; and embedding the second watermark into a global vector of the first content based on the spread spectrum strategy, to generate the second content with the dual watermarks.

9. The method according to claim 1, wherein the generating second content with the dual watermarks comprises:

embedding the second watermark into the first content; and embedding the first watermark into the first content with the second watermark, to generate the second content with the dual watermarks.

10. An electronic device, comprising:

at least one processor; and memory coupled to the at least one processor and having instructions stored therein, wherein the instructions, when executed by the at least one processor, cause the electronic device to perform actions comprising:

generating, by a content generation model, first content based on a user-inputted instruction;

14 generating a first watermark for determining a user source based on a user identifier;

generating a second watermark for determining a model source based on a model parameter of the content generation model; and embedding the first watermark and the second watermark into the first content to generate second content with dual watermarks;

wherein the first watermark is generated at least in part as a function of (i) a local feature, the local feature being determined based on the user identifier and at least one key associated with the user identifier, and (ii) at least one random feature.

11. The electronic device according to claim 10, wherein the generating a first watermark for determining a user source comprises:

generating the local feature based on the user identifier and a shared key corresponding to the user identifier; and generating a local watermark for determining the user source based on a product of the local feature and a preset first random feature.

12. The electronic device according to claim 11, wherein the generating a second watermark for determining a model source comprises:

generating a global watermark for determining the model source based on the model parameter and a preset second random feature.

13. The electronic device according to claim 12, wherein the generating second content with the dual watermarks comprises:

embedding the local watermark and the global watermark into a frequency domain or a spatial domain of the first content based on a spread spectrum strategy, to generate the second content with the dual watermarks.

14. The electronic device according to claim 13, wherein the actions further comprise:

extracting a local watermark in the second content after the watermarks are embedded based on the spread spectrum strategy and the first random feature; and determining the user identifier based on the extracted local watermark and the shared key.

15. The electronic device according to claim 14, wherein the actions further comprise:

extracting a global watermark in the second content after the watermarks are embedded based on the spread spectrum strategy and the second random feature; and determining the content generation model based on the extracted global watermark.

16. The electronic device according to claim 10, wherein the generating second content with the dual watermarks comprises:

determining a just noticeable difference (JND) value for each pixel or coefficient in the first content;

adjusting each pixel value or coefficient value of the first watermark and the second watermark based on the JND value and each pixel value or coefficient value in the first content; and embedding the adjusted first watermark and the adjusted second watermark into the first content to generate the second content with the dual watermarks.

17. The electronic device according to claim 10, wherein the generating second content with the dual watermarks comprises:

embedding the first watermark into a local vector of the first content based on a spread spectrum strategy; and embedding the second watermark into a global vector of the first content based on the spread spectrum strategy, to generate the second content with the dual watermarks.

18. The electronic device according to claim 10, wherein the generating second content with the dual watermarks comprises:

embedding the second watermark into the first content; and embedding the first watermark into the first content with the second watermark, to generate the second content with the dual watermarks.

19. A computer program product comprising a non-transitory computer-readable medium having machine-executable instructions stored therein, wherein the machine-executable instructions, when executed by a machine, cause the machine to perform actions comprising:

generating, by a content generation model, first content based on a user-inputted instruction;

generating a first watermark for determining a user source based on a user identifier;

generating a second watermark for determining a model source based on a model parameter of the content generation model; and embedding the first watermark and the second watermark into the first content to generate second content with dual watermarks;

wherein the first watermark is generated at least in part as a function of (i) a local feature, the local feature being determined based on the user identifier and at least one key associated with the user identifier, and (ii) at least one random feature.

20. The computer program product according to claim 19, wherein the generating a first watermark for determining a user source comprises:

generating the local feature based on the user identifier and a shared key corresponding to the user identifier; and generating a local watermark for determining the user source based on a product of the local feature and a preset first random feature.

\* \* \* \* \*